(12) United States Patent
Lamorlette et al.

(10) Patent No.: US 6,216,595 B1
(45) Date of Patent: Apr. 17, 2001

(54) PROCESS FOR THE IN-FLIGHT PROGRAMMING OF A TRIGGER TIME FOR A PROJECTILE ELEMENT

(75) Inventors: Gérard Lamorlette, Trezelles; Thierry Bredy, Asnières les Bourges, both of (FR)

(73) Assignee: Giat Industries, Versailles (FR)

( * ) Notice: Subject to any disclaimer, the term of this patent is extended or adjusted under 35 U.S.C. 154(b) by 0 days.

(21) Appl. No.: 09/054,520

(22) Filed: Apr. 3, 1998

(30) Foreign Application Priority Data

Apr. 3, 1997 (FR) .................................................. 97 04051

(51) Int. Cl.⁷ ...................................................... F41F 1/00
(52) U.S. Cl. .............................. 102/270; 102/200; 89/6.5; 244/3.15
(58) Field of Search ..................... 102/270, 200; 244/3.15; 89/6.5

(56) References Cited

U.S. PATENT DOCUMENTS

| | | | | |
|---|---|---|---|---|
| 3,995,792 | * | 12/1976 | Otto et al. ............................. | 244/3.14 |
| 4,237,789 | * | 12/1980 | Stauers et al. ........................ | 102/270 |
| 4,283,989 | * | 8/1981 | Toulios et al. ........................ | 89/6.5 |
| 4,837,718 | * | 6/1989 | Alon ...................................... | 364/565 |
| 5,440,990 | * | 8/1995 | Wiedefeld et al. ................... | 102/215 |
| 5,787,785 | * | 8/1998 | Muenzel et al. ....................... | 89/6.5 |
| 5,814,755 | * | 9/1998 | Boss ....................................... | 89/6.5 |
| 5,814,756 | * | 9/1998 | Boss ....................................... | 89/6.5 |
| 5,834,675 | * | 11/1998 | Boss ....................................... | 89/6.5 |

FOREIGN PATENT DOCUMENTS

| | | | |
|---|---|---|---|
| WO 83/03894 | 11/1983 | (WO) .................................. | 244/3.23 |
| WO 84 03759 | 9/1984 | (WO) .................................. | 244/3.11 |
| WO 89 07744 | 8/1989 | (WO) .................................. | 244/3.14 |
| WO 96/25641 | 8/1996 | (WO) .................................. | 244/3.11 |

* cited by examiner

*Primary Examiner*—Charles T. Jordan
*Assistant Examiner*—Lulit Semunegus
(74) *Attorney, Agent, or Firm*—Oliff & Berridge, PLC

(57) ABSTRACT

A process for the in-flight programming of a trigger time for an element of a projectile by a fire control system of a weapon, wherein the muzzle velocity (Vo) of the projectile is measured and the distancing velocity of the projectile at at least one other point during its trajectory after exiting the weapon barrel it measured. Based on these measured values an optimal trigger time is determined for the element so as to minimize the difference between the actual ground impact point and the desired ground impact point for the projectile or for a payload released during the payload's trajectory, and a programming or corrective programming is transmitted to the projectile which takes this optimal trigger time into account.

19 Claims, 6 Drawing Sheets

PROCESS FOR THE IN-FLIGHT PROGRAMMING OF A TRIGGER TIME FOR A PROJECTILE ELEMENT

BACKGROUND OF THE INVENTION

The technical scope of the invention is that of processes enabling the in-flight programming of a time to trigger a projectile element form the fire control system of a weapon.

Projectiles fired from a cannon theoretically have a well-known ballistic trajectory.

However, certain non-reproducible external factors are able to influence this trajectory.

It is known that the muzzle velocity (Vo) of the projectile can vary by a few percent from one powder charge to another depending on the firing conditions, for example, temperature, consistency of the characteristics of the powder, and barrel wear. This results in deviations in the impact on the ground of the projectile, the ground impact point varying from 1 to 35 km from the firing weapon system.

The atmospheric conditions as well as the differences concerning the drag coefficient of the projectile also notably influence its trajectory.

So as to improve firing accuracy, it is known to transmit an order to correct the trajectory to the projectile.

U.S. Pat. No. 3,995,792 thus describes a projectile whose actual trajectory is measured using laser tracking means. A fire control system using this measurement computes the deviation between the actual trajectory and the theoretical trajectory and transmits corrective orders to the projectile enabling the actual trajectory to draw nearer to the theoretical trajectory.

The trajectory is corrected, for example, using boosters or steering fins.

One drawback of such a solution is its cost. In fact, the tracking of the projectile trajectory requires the implementation of powerful (and therefore expensive) means whose range extends beyond 15 km.

Such tracking means are also bulky and are difficult to implement.

Additionally, the use of laser tracking over a major part of the trajectory prejudices firing secrecy and creates the risk of making it easier for hostile forces to locate the artillery.

A fully autonomous projectile is also known which locates its own position by means of a global positioning system (GPS).

Before firing, the projectile is programmed with its theoretical trajectory and the desired ground impact point. It measures its own actual trajectory and, using suitable algorithms, controls the implementation of trajectory correcting means.

Such a projectile is extremely costly, since it integrates an electronic unit combined with a global positioning system. Moreover, the global positioning system is bulky and prejudices the on-board load capacity of the projectile.

Patent WO84/03,759 describes a device which increases the precision of artillery firing. This device implements a speedometer, a projectile tracking radar and radio transmission means.

The radar tracks the projectile over its full trajectory and a second radar monitors the position of the target. The fire control system transmits a trajectory correction order at a given time to the projectile in order to bring it closer to its target.

Such a device is costly to implement, since two radars are required; one to track the target, the other to track the projectile. Secrecy is not ensured either, since the correction order is sent far from the firing platform.

SUMMARY OF THE INVENTION

The aim of the invention is to propose a process (and associated fire control system system) enabling the in-flight programming of a trigger time for a projectile element, process and fire control system which are free from the drawbacks characterizing known systems.

Thus, the process according to the invention enables firing accuracy to be substantially improved without requiring the use of expensive equipment.

Furthermore, it does not adversely affect the firing secrecy of the weapon system.

A further aspect of the invention is a fuse intended to equip a projectile and to be programmed by the process according to the invention.

This simple and inexpensive fuse can be adapted to any type of projectile and thus enables the firing accuracy of conventional projectiles already in store in the armed forces to be improved.

Thus, the subject of the invention is a process for the in-flight programming of a trigger time for a projectile element by a weapon fire control system, the process comprising the following steps:

the muzzle velocity (Vo) of the projectile is measured, the distancing velocity of the projectile at at least one other point during its trajectory after exiting the weapon barrel is measured, based on these measured values an optimal trigger time is determined for the projectile element so as to minimize the difference between the actual ground impact point and the desired ground impact point for the projectile or for a payload released during its trajectory, a programming or corrective programming is transmitted to the projectile which takes this optimal trigger time into account.

Advantageously, in order to determine the optimal trigger time, it is possible to:

determine the difference with respect to the predictable ground impact point which can be attributed to the variation measured in the muzzle velocity (Vo) of the projectile, deduct the predictable deviation with respect to the ground impact point attributable to the variation in aerodynamic drag by subtracting from a measurement of the distancing velocity the variation in distancing velocity attributable to the variation in muzzle velocity, add the two predictable deviations thus estimated.

To determine the optimal trigger time, it is also possible to:

determine the predictable deviation with respect to the ground impact point by carrying out a linear combination of the differences in velocity measured at at least two points.

According to a variant embodiment of the process, it is possible to:

before firing, program a theoretical trigger time taking into account the characteristics of the required theoretical trajectory, after firing, transmit a correction to the initial programming to the projectile.

Alternatively, a program is transmitted to the projectile after firing in the form of a trigger time counted from a reference time.

In any event, transmission to the projectile will be carried out in the first moments of the projectile trajectory, for example at a distance from the weapon less than or equal to ten kilometers.

A further subject of the invention is a fire control system implementing such a process, such fire control wherein the system comprises a speedometer, a computer and transmission means.

The tachometer will advantageously use radar technology.

The transmission means can be formed by the radar speedometer itself.

On other subject of the invention is a programmable fuse intended to be installed on a projectile and programmed by such a fire control system, the fuse comprises a timer, a receiver, a computation unit and an element which is triggered during the trajectory.

The element triggered during the trajectory can be means to brake the projectile thus modifying its aerodynamic drag, or else a pyrotechnic charge to eject at least one submunition.

One of the advantages of the invention lies in the fact that it enables the rapid acquisition of an estimated trajectory of a projectile using simple and inexpensive means.

Another advantage of the invention is that it promotes firing secrecy, the distancing velocity measurements being few in number (from one to three), carried out periodically rather than continuously and at a short distance from the weapon.

A further advantage is that the fuse is programmed at a reduced distance from the weapon thereby improving programming reliability and reducing its vulnerability to scrambling.

BRIEF DESCRIPTION OF THE DRAWINGS

The invention will be better understood after reading the following description of the different embodiments, the description made with reference to the appended drawings, in which.

DESCRIPTION OF THE PREFERRED EMBODIMENTS

Figure 1:
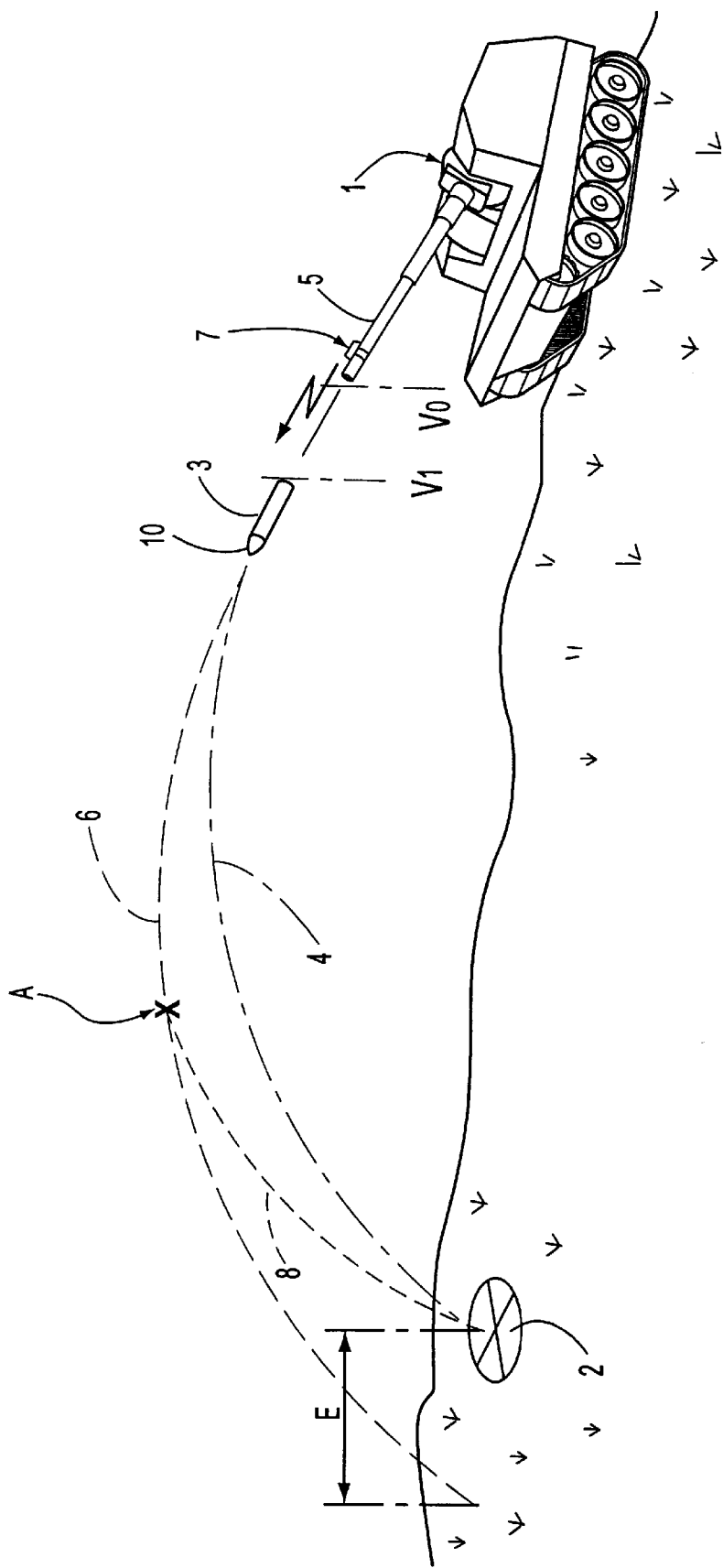
FIG. 1 schematically illustrates the implementation of the process according to the invention using a piece of artillery.

With reference to FIG. 1, a piece of artillery 1, such as a self-propelled howitzer, is attempting to hit a target 2 by means of a projectile 3. The theoretical ballistic trajectory of the projectile is shown by curve 4. A fire control system (not shown), integrated with the piece of artillery 1, determines the elevation and traverse angles, depending on the coordinates of target 2 and self-propelled howitzer 1, which must be given to barrel 5 as well as the propellant charge which will have to be used in order to obtain theoretical trajectory 4.

Given notably the differences in the characteristics of the powder and those due to the temperature, the muzzle velocity Vo of the projectile upon exiting the barrel of the weapon will not be that which is required.

Moreover, the resistance (or aerodynamic drag) is not fully controlled (it notably depends on the profile of the projectile driving band upon exiting the barrel, and therefore on barrel wear).

The wind also influences the trajectory of projectile 3.

This results, for projectile 3, in an actual trajectory 6 which notably deviates from the theoretical trajectory and which leads to a deviation E at the ground impact point of the projectile.

In practical terms, it would be able to show that for a variation of 1% in muzzle velocity we obtain a deviation of 600 m with respect to the aimed impact point at a distance of 35 km from the howitzer.

It has been also verified that the variations in the aerodynamic drag coefficient of the projectile could reach 2% leading to an error of 900 m with respect to the aimed impact point at a firing distance of 35 km.

Up to now, it was known to measure muzzle velocity Vo by means of a speedometer 7, for example radar, this in order to take this measurement into account in firing the next projectile.

The process according to the invention proposes to measure not only Vo but also at least one other value (V1) of the distancing velocity of projectile 3.

The second measurement V1 is carried out at a distance from the weapon of about 5000 m.

The velocities measured with the aid of a Doppler tachometer are distancing velocities, that is they are velocities taken along a straight line joining the speedometer to the projectile.

The fire control system has thus two actual velocity values. It can determine an approximation of actual trajectory 6 and notably the muzzle velocity and drag coefficient.

In a first embodiment of the invention, the projectile is an explosive projectile intended to have a trajectory right down to the ground.

So that it can reach the ground at target 2, it is therefore necessary for the trajectory of the projectile to be corrected.

We could, for example, resort to a pyrotechnic booster or use unfoldable steering fins.

It will be particularly advantageous to provide a device enabling the aerodynamic drag of the projectile to be increased, for example unfoldable aerobrakes.

The deployment of such a device will cause the projectile to brake and will modify its ballistic trajectory.

Depending on the characteristics of the braking device employed, and based on the preceding velocity measurements, the fire control system can determine an optimal trigger time for the projectile element such as to minimize deviation E between the actual ground impact point and the required ground impact point.

This trigger time corresponds to point A shown in FIG. 1. After point A, trajectory 8 followed by the projectile brings the ground impact point of the projectile closer to target 2, thereby minimizing deviation E.

After computation of the optimal trigger time, this value is transmitted to the projectile, for example, by means of the speedometer or by a separate radio link.

In practical terms, when designing the fire control system, the braking characteristics of the drag modification device merely have to be known.

Firing tables will then be established (by means of preliminary trials and computations) enabling the correlation to be made for each theoretical trajectory (defined by the firing angles and the muzzle velocity) of the deviations E with respect to the aimed point of impact depending on the deviations measured. These correlations will be established both for the muzzle velocity and for an ulterior velocity, this second velocity measurement enabling that part of the deviation due to the variation in actual aerodynamic drag of the projectile to be estimated.

The algorithms thus computed will enable, for a given theoretical trajectory (and therefore a theoretical Vo and given firing angles) and based on two successive measurements of the distancing velocity, the time to be determined at which the device to increase the drag (or braking) must be deployed.

Figure 2:
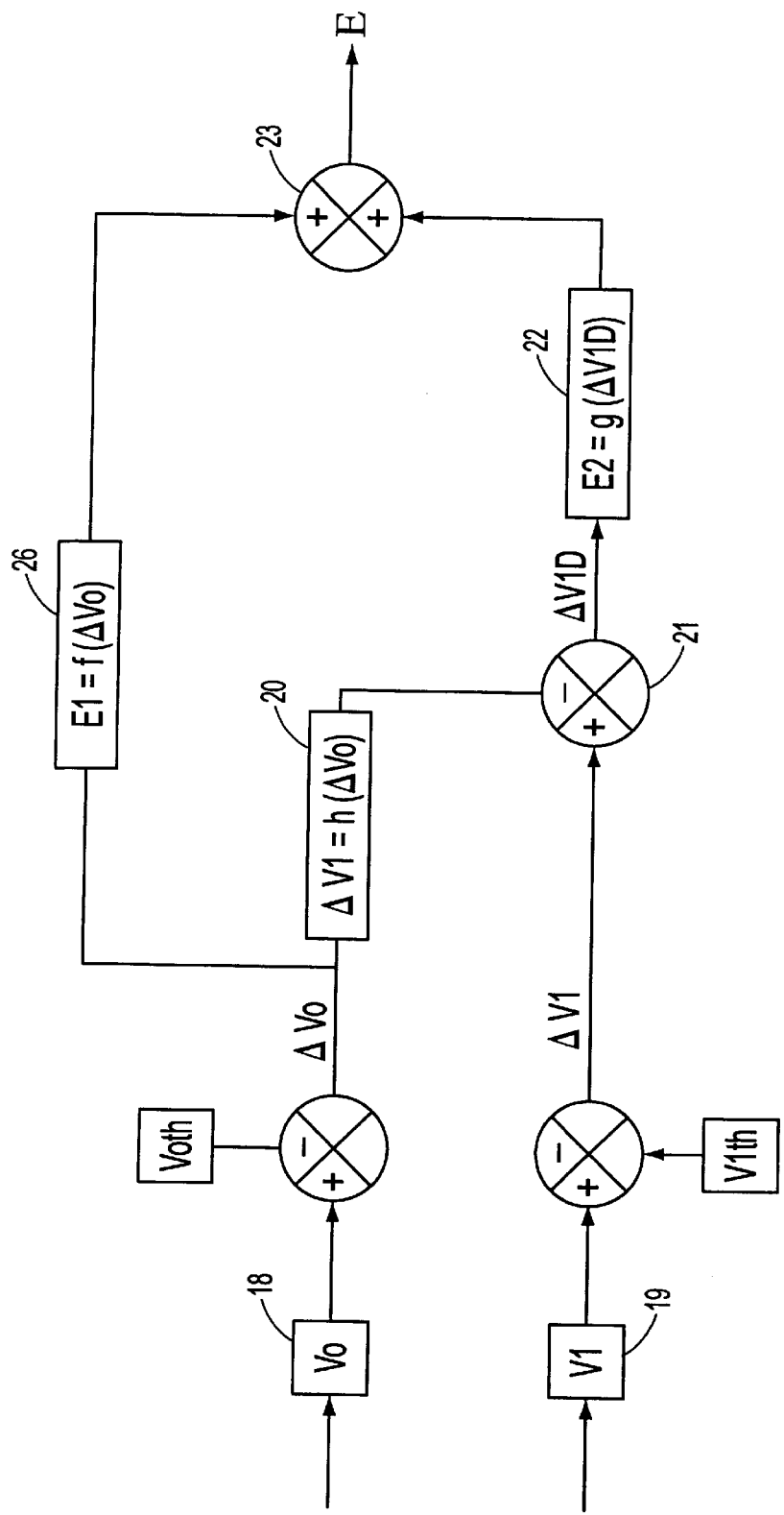
FIG. 2 illustrates an algorithm which, based on two measurements of the distancing velocity of the projectile, enables the deviation which would be observed in the vicinity of the target to be determined.

FIG. 2 shows an example of an algorithm which, based on two measurements of the distancing velocity of the projectile, enables the deviation to be determined which would be observed (without correction of the trajectory) in the vicinity of the target.

Step 18 corresponds to the measurement of the Vo, the measured value is compared to the Voth (theoretical Vo) which is stored (firing table). The computer thereafter determines a $\Delta$Vo which is the measured deviation.

Step 19 corresponds to the measurement of V1. This measured value is compared to a value V1th (theoretical V1) which is stored (another firing table), which enables the deviation with respect to V1 to be determined, noted $\Delta$V1.

The deviation measured with respect to V1 partly corresponds to the deviation observed with respect to Vo and partly to the influence of the actual aerodynamic drag.

A function h has also been stored which links the $\Delta$V1 to the $\Delta$Vo (block 20). The difference between the measured $\Delta$V1 and the expected one given the measured $\Delta$Vo is thus computed (comparator 21). This difference is noted $\Delta$V1D and corresponds to the velocity deviation exclusively due to the actual aerodynamic drag.

The function f has been stored (block 26) in a firing table and gives the forecasted deviation observed in the vicinity of the target for a given variation in velocity due to the muzzle velocity ($\Delta$Vo).

The function g has also been stored (block 22) in another firing table and gives the forecasted deviation observed in the vicinity of the target for a given variation in velocity due to the aerodynamic drag ($\Delta$V1D).

Finally, the deviations due to both the variation in muzzle velocity and to the variation in drag are added (analog adder 23) in order to determine deviation E which will be observed with respect to the target.

Another algorithm will then be used to determine the time at which the trajectory must be corrected in order to minimize deviation E. The optimal time will depend on the characteristics of the braking means used, characteristics which are stored in the fire control system.

Figure 3:
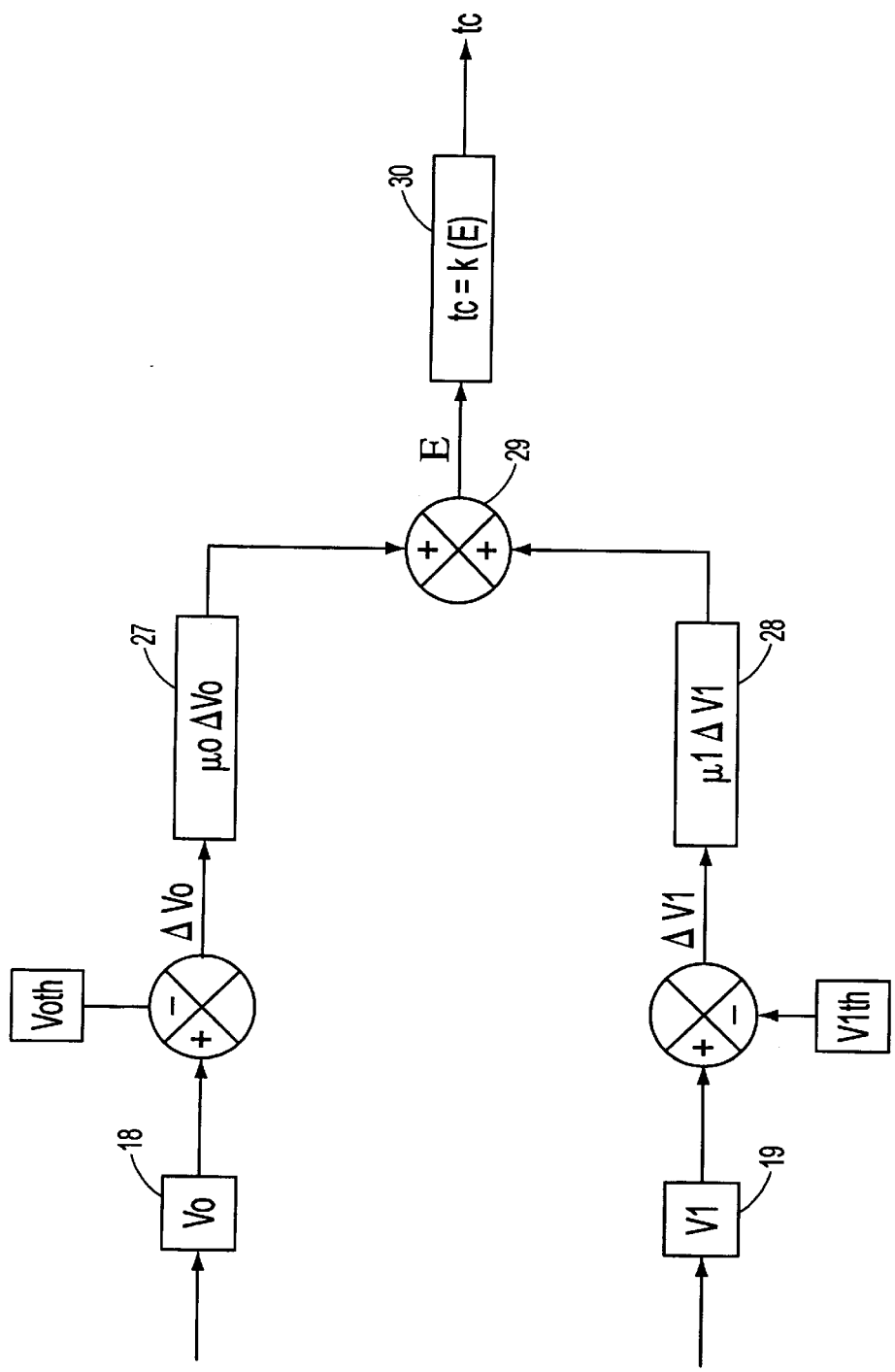
FIG. 3 illustrates another algorithm enabling the deviation to be determined.

FIG. 3 shows a variant to the preceding algorithm in which the measured deviations $\Delta$Vo and $\Delta$V1 are respectively multiplied by coefficients $\mu$o (block 27) and $\mu$1 (block 28) which are read in the specific firing tables and which depend on the firing conditions (firing angles and muzzle velocities).

The forecasted deviation E is obtained by adding (analog adder 29) $\mu$o×$\Delta$Vo+$\mu$1×$\Delta$V1.

The coefficient tables $\mu$o and $\mu$1 are determined by computation (and/or trials).

Furthermore, a function k has been stored in another firing table (block 30) and gives the correction time tc, according to forecasted deviation E, which must be sent to the projectile so as to minimize the deviation obtained.

This function k depends on the characteristics of the braking means used.

The advantage of such a process lies in that it can be implemented in an extremely simple manner by using a conventional Doppler speedometer. It is therefore no longer necessary to resort to a radar ensuring tracking over most of the trajectory. This results in substantial savings and improved secrecy.

By way of numerical example, for a fire on a target at a distance of 35 km, the standard deviation observed upon ground impact is of around 560 m for a projectile having no corrective device. It is nearer to 150 m for a projectile fitted with braking means which operate during the trajectory and implemented using the programming process according to the invention.

Figure 4:
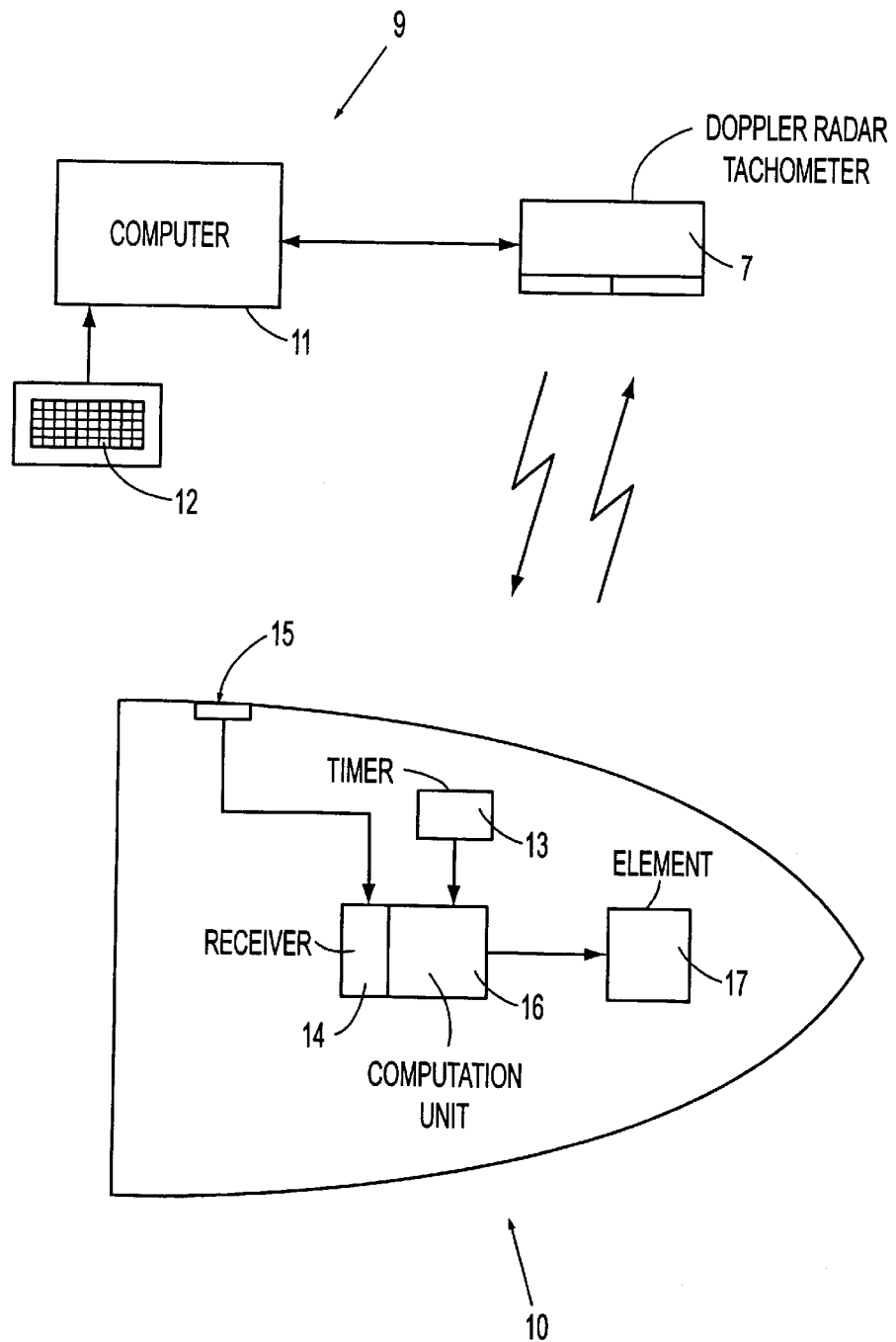
FIG. 4 is a block diagram which shows the fire control system integral with the weapon and the fuse carried by the projectile.

FIG. 4 schematically illustrates, firstly, a fire control system 9 implementing such a process, and secondly, a fuse 10 equipping projectile 3.

The fire control system incorporates a computer 11, a programming interface 12 and a Doppler radar speedometer 7.

Fuse 10 contains a timer 13, a receiver 14 to receive the programming orders connected to an antenna 15, a computation unit 16 and an element 17 which is triggered during the trajectory and which causes the braking means to unfurl, for example. It also contains a source of power (of a known type, not shown) such as a battery primed by firing the projectile.

Antenna 15 is made, for example, in the form of a board carrying a printed circuit (or patch) arranged on the wall of the fuse.

Computer 11 of the fire control system incorporates different memories or registers storing the firing tables giving the theoretical Vo and V1 velocity values according to the aim sights and propellant charges used.

It also incorporates the computation algorithms which enable the velocity measurements carried out to be appropriately utilized (for example, the algorithm in FIG. 2).

It also contains the algorithm which, depending on forecasted deviation E with respect to the aimed target and, for example, on the braking characteristics of element 17, enabling the optimal time to trigger element 17 to be determined thereby minimizing deviation E.

After computing the optimal trigger time for element 17, fire control system 9 transmits programming data from computation unit 16 to fuse 10.

This data can be transmitted by radio using a radio frequency emitter (not shown) or else by speedometer 7 using the radar frequency as a carrier wave.

Antenna 15 of the fuse receives this programming data which can be decoded and converted into a digital signal by receiver 14. The programming is thereafter introduced into the computation unit 16 memory or register which will trigger element 17 at the required time.

The fuse will be equipped with known means, not shown, enabling the firing time to be determined.

The programming transmitted can correspond to a lapse of time counting from the firing time, or else counting from another reference time transmitted by the fire control system.

The computation unit of the fuse, in this case, contains data both related to the reference time and to the amount of time which should separate the reference time from the time at which element 17 is to be triggered. It merely has to measure the time (given by timer 13) which passes counting from the reference time, constantly compare this time with the programmed duration and trigger element 17 when the time actually passed corresponds to the programmed time.

Alternatively, fuse 10 can receive prior programming when it is in the weapon, which will give it a trigger time for element 17 corresponding to a theoretical deviation E to be corrected, said deviation being computed by taking known firing conditions into account.

The process according to the invention will enable certain actual parameters of the firing in question to be computed (actual muzzle velocity, decrease in velocity due to the actual aerodynamic drag). It will use them to determine an estimated deviation E and will send a simple modification of the initial program to the fuse in order to take the difference between the foreseen theoretical deviation E and the estimated deviation E into account.

The distribution of the components between fire control system 9 and fuse 10 can naturally be modified.

Distancing velocity values measured by the Doppler radar could, for example, be transmitted to the fuse, in which case the fuse would contain the algorithms enabling it to determine the trigger time for itself.

Figure 5A:
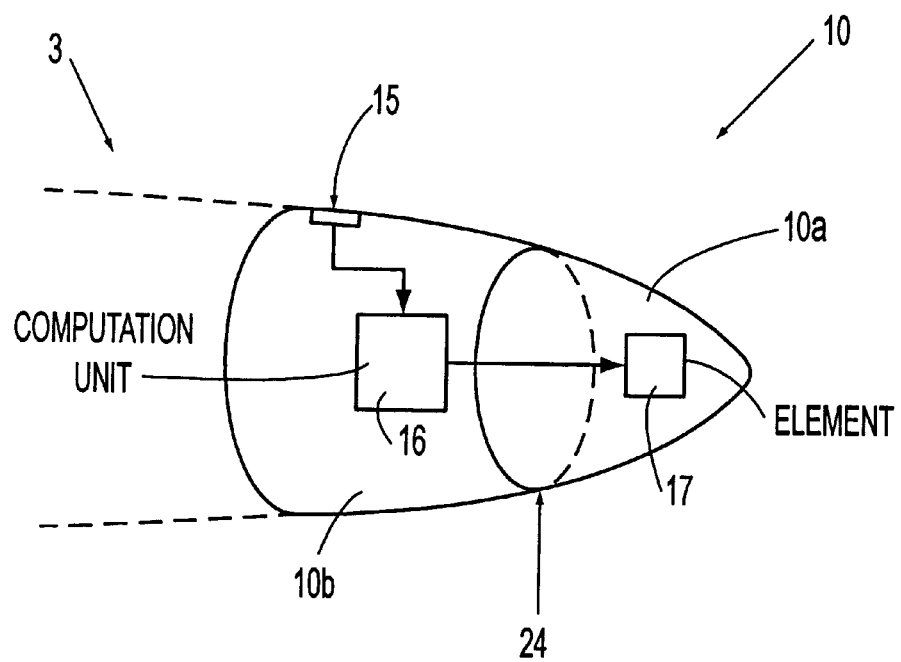
FIGS. 5a and 5b illustrate a particular embodiment of the fuse, respectively in its flight position and in its braking position, and FIG. 6 schematically illustrates another implementation of the process according to the invention using a piece of artillery.

FIG. 5a shows by way of example a fuse 10 which incorporates a front part 10a and a rear part 10b. Rear part 10b contains the different electronic circuits and notably computation unit 16 connected to antenna 15.

Front part 10a contains element 17 which, in this case, is formed by a pyrotechnic charge initiated by an electrical primer.

Front part 10a and rear part 10b are separated by a ring-shaped incipient fracture 24. Front part 10a can, for example, be formed by a thin casing made of steel which is clipped into or bonded onto a groove carried in rear part 10b.

At the optimal time, determined by the fire control system and contained in computation unit 16, the latter causes the initiation of pyrotechnic charge 17. The resulting pressure build up inside front part 10a causes it to separate from the rear part 10b.

Figure 5B:
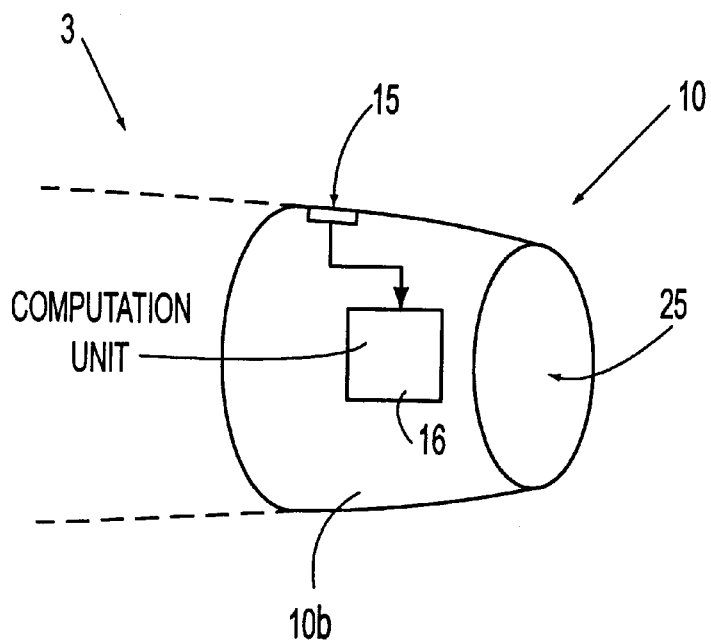

This ejection of front part 10a causes a sudden change in the profile of fuse 10 which opposes the aerodynamic flow presenting a plan face (FIG. 5b).

This results in the braking of the projectile and a modification of its ballistic trajectory, which moves (see FIG. 1) from trajectory 6 to trajectory 8, thus bringing projectile 3 closer to target 2.

Naturally, the braking characteristics caused by plane face 25 have been integrated in the form of a firing table into fire control system 9 thereby enabling the latter to determine the optimal trigger time enabling deviation E to be minimized.

The advantage of such a fuse lies in its compactness. Its total bulk is no greater than that of usual artillery fuses. It is therefore possible to use it on all conventional artillery shells which currently equip the armed forces thereby improving the performances of artillery systems for a relatively reduced cost.

Different aerodynamic braking means may naturally be selected, for example unfoldable wings or aerobrakes. Element 17 can in this case be micromotor, or a pyrotechnic means, or else a centrifugal device ensuring the unfurling of the wings.

The braking characteristics of these means will also be determined and stored in fire control system 9, several types of fuses having different braking means can also be handled by the same fire control system.

The above description was made with reference to an explosive shell having a theoretical ground impact point with respect to which the fire control system determines a forecasted deviation which it tries to minimize.

The invention can also be applied to a shell whose effectiveness is not a result of its actual impact on the ground but which releases sub-munitions, guided or otherwise, during its trajectory.

In this case, the operating principle remains the same. The computed trajectories are determined with respect to a theoretical ground impact point and the correction of the trajectory is always effected so as to minimize the theoretical deviation.

In this case, the fuse used will have a complementary function which is to trigger the ejection of the sub-munition or sub-munitions at a given time.

Known timer fuses are programmed with a flight time after which ejection must be triggered, this ejection usually occurs in the last moments of the trajectory, at a time such that the projectile is at an altitude of about 500 to 1000 m with respect to the ground.

The fuse according to the invention will also trigger ejection but at a time which will be corrected so as to take into account the modification of the trajectory which has been made. This replacement programming of the ejection time can be transmitted to the fuse by the fire control system at the same time as the programming for the trajectory correction time.

It can also advantageously be computed by the computation unit of the fuse depending on the trigger time of the correction mechanism received from the fire control system and by means of a suitable algorithm stored in the fuse.

It is lastly possible using the process according to the invention to program an order to eject the sub-munitions during the trajectory rather than an order to correct the trajectory at a given time. In this case, element 17 will be the pyrotechnic charge which ejects the sub-munitions.

Figure 6:
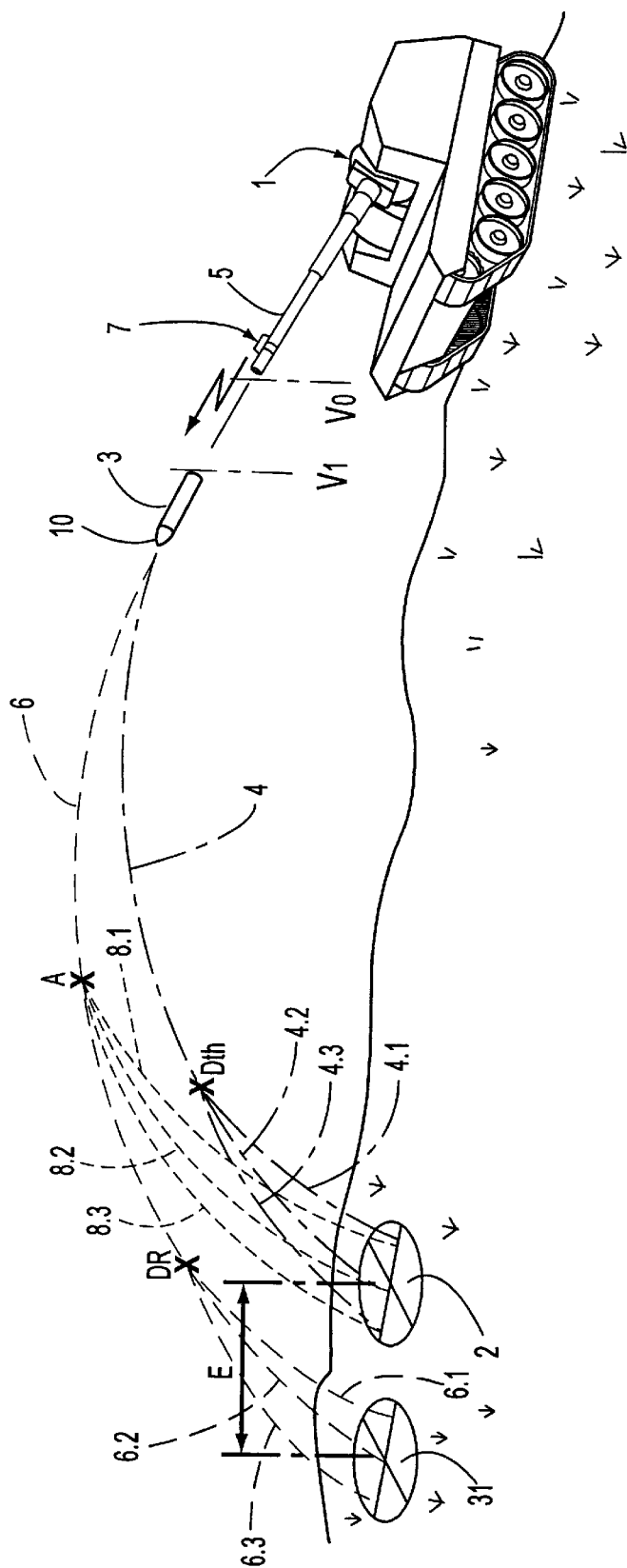

FIG. 6 schematically illustrates such an implementation of the process according to the invention.

The theoretical ballistic trajectory of the projectile is show by curve 4. At point Dth of this curve, projectile 3 ejects the sub-munitions (in this example there are three of them), which then follow theoretical trajectories 4.1, 4.2, and 4.3, which leads them to impact on the ground within target area 2.

Given the disturbances during the flight, the actual trajectory followed by projectile 3 after being fired is the one shown by curve 6.

Normal triggering of the fuse would lead to the sub-munitions being scattered at point DR on this trajectory. The sub-munitions would in this case follow trajectories 6.1, 6.2, and 6.3 which would bring them into an area 31 separate from target area 2 and at an average distance from the latter which corresponds to deviation E.

In order to minimize this deviation E, fuse 10 used will implement the process according to the invention.

It will thus trigger ejection at a time which will be corrected so as to take into account the modification to the trajectory made for the projectile.

Ejection will therefore take place at point A on actual trajectory 6, a point located before theoretical ejection point DR. The sub-munitions will, in this case, follow trajectories 8.1, 8.2, and 8.3 which will bring them into target area 2.

The fire control system will therefore determine, depending on the measured velocities, the forecasted deviation of the ground impact points of the sub-munition or sub-munitions (that is the deviation between areas 2 and 31) rather than the theoretical and forecasted ground impact point for the projectile itself.

The optimal time determined by the fire control system will, in this case, be the time at which the sub-munitions must be ejected so that they are able to cover target area 2 despite the deviation of the actual trajectory with respect to the theoretical trajectory.

The firing tables described previously with reference to FIGS. 2 and 3, and notably the one giving the trigger time (tc) depending on forecasted deviation E, will be established as a function of the mean ballistic trajectories of the sub-munitions rather than as a function of the characteristics of a braking means, which in this example is absent, for the ejection at a given point in the trajectory.

By way of a variant, it is naturally possible to implement a process in which a second measurement, or several successive measurements, of the distancing velocity of the projectile is taken, or else in which a continuous measurement of this velocity is taken over part of the initial trajectory of the projectile.

In any event, these measures will be taken at a reduced distance from the weapon (less than 10 km) thereby enabling simple, low power transmission means to be used thus promoting firing secrecy.

What is claimed is:

1. A process for the in-flight programming of a trigger time for an element of a projectile by a fire control system of a weapon, comprising the steps of:
    a muzzle velocity of said projectile is measured,
    a distancing velocity of said projectile at at least one other point during its trajectory after exiting the weapon barrel is measured,
    based on these measured values an optimal trigger time is determined for said element so as to minimize the difference between the actual ground impact point and the desired ground impact point for said projectile or for a payload released during its trajectory,
    a programming or corrective programming is transmitted to said projectile in flight which takes this optimal trigger time into account.

2. A process according to claim 1, to determine the optimal trigger time wherein:
    the difference with respect to the predictable ground impact point which can be attributed to the variation measured in the muzzle velocity (Vo) of said projectile is determined,
    the predictable deviation with respect to the ground impact point attributable to the variation in aerodynamic drag is calculated by subtracting from a measurement of the distancing velocity the variation in distancing velocity attributable to the variation in muzzle velocity.
    the two predictable deviations thus estimated are added together.

3. A process according to claim 1, to determine the optimal trigger time wherein:
    the predictable deviation with respect to the ground impact point is determined by carrying out a linear combination of the difference in velocity measured at at least two points.

4. A process according to claim 1, wherein:
    before firing, a theoretical trigger time is programmed taking into account characteristics of a required theoretical trajectory,
    after firing, a correction to the initial programming is transmitted to the projectile.

5. A process according to claim 4, wherein a program is transmitted to said projectile after firing in the form of a trigger time counted from a reference time.

6. A process according to claim 1, wherein the transmission to said projectile is carried out in the first moments of the projectile trajectory.

7. The process according to claim 6, wherein the first moments of the projectile trajectory occur when the projectile is at a distance from the weapon less than or equal to 10 kilometers.

8. A fire control system for the in-flight programming of a trigger for a projectile comprising a speedometer, a computer transmission means for transmitting to the projectile during a flight trajectory, and a programmable fuse, comprising a timer, a receiver, a computation unit and an element which is triggered during the flight trajectory, wherein said speedometer uses radar technology.

9. A fire control system according to claim 8, wherein said transmission means are formed by the radar speedometer.

10. The fire control system according to claim 8, wherein said element triggered during the trajectory is a means to brake said projectile thus modifying aerodynamic drag of the projectile.

11. The fire control system according to claim 8, wherein said element triggered during the trajectory is a pyrotechnic charge to eject at least one sub-munition.

12. A process used by a fire control system of a weapon to correct a trajectory of a projectile in flight, the projectile fired by the weapon, comprising the steps of:
    measuring a muzzle velocity of the projectile substantially at a time the projectile leaves the weapon;
    measuring a flight velocity of the projectile at at least one point along the trajectory;
    computing an optimal trigger time for an element of the projectile to correct an actual trajectory of the projectile to provide projectile detonation substantially at a designated target impact point; and
    providing triggering programming to the projectile in flight based on the optimal trigger time.

13. The process according to claim 12, wherein the step of computing an optimal trigger time comprises the steps of:
    comparing the muzzle velocity to a theoretical velocity to obtain an initial velocity deviation;
    comparing the flight velocity to a theoretical flight velocity to obtain a flight velocity deviation;
    calculating an expected flight velocity deviation;
    determining a difference between the expected flight velocity deviation and the flight velocity deviation to obtain an air drag factor;
    computing an expected target impact point deviation on a basis of the initial velocity deviation;
    computing an expected target impact point deviation on a basis of the air drag factor; and
    determining an estimated deviation from the target impact point using the expected target impact point deviations based on the initial velocity deviation and the air drag factor.

14. The process according to claim 13, further comprising the step of determining a trigger time for the element on a basis of the estimated deviation from the target impact point.

15. The process according to claim 12, wherein the step of computing an optimal trigger time comprises the steps of:
- comparing the muzzle velocity to a theoretical velocity to obtain an initial velocity deviation;
- comparing the flight velocity to a theoretical flight velocity to obtain a flight velocity deviation;
- adjusting the initial velocity deviation and the flight velocity deviation respectively on the basis of predetermined firing conditions; and
- combining the adjusted initial velocity deviation and the adjusted flight velocity deviation to obtain an estimated deviation from the target impact point.

16. The process according to claim 15, wherein the step of computing the optimal trigger time comprises applying a correction factor to the estimated deviation from the target impact point.

17. The process according to claim 12, wherein the measuring steps are accomplished using a radar speedometer mounted to the weapon.

18. The process according to claim 12, further comprising a step of triggering the element of the projectile on a basis of triggering programming wherein the trajectory of the projectile is altered.

19. The process according to claim 12, further comprising a step of ejecting submunitions from the projectile on a basis of triggering programming, wherein a trajectory of the sub-munitions is altered.

* * * * *